US005970128A

United States Patent [19]
Kim

[11] Patent Number: 5,970,128
[45] Date of Patent: Oct. 19, 1999

[54] TELEPHONE DEVICE FOR CALLER IDENTIFICATION

[75] Inventor: Sang-Woo Kim, Yongin-shi, Rep. of Korea

[73] Assignee: Samsung Electronics, Co., Ltd., Suwon, Rep. of Korea

[21] Appl. No.: 08/993,700

[22] Filed: Dec. 18, 1997

[30] Foreign Application Priority Data

Dec. 18, 1996 [KR] Rep. of Korea ...................... 96 67476

[51] Int. Cl.[6] ........................................................ H04M 1/56
[52] U.S. Cl. ............................................ 379/142; 379/376
[58] Field of Search .............................. 379/93.17, 93.23, 379/142, 372, 376; 375/334, 337, 328, 326

[56] References Cited

U.S. PATENT DOCUMENTS

| | | | |
|---|---|---|---|
| 5,602,908 | 2/1997 | Fan | 379/142 |
| 5,649,002 | 7/1997 | Brady et al. | 379/142 |
| 5,781,621 | 7/1998 | Lim | 379/142 |
| 5,783,967 | 7/1998 | Takaya | 375/328 |
| 5,836,009 | 11/1998 | Diamond et al. | 379/142 |

*Primary Examiner*—Paul Loomis
*Attorney, Agent, or Firm*—Marger Johnson & McCollom, P.C.

[57] ABSTRACT

A Caller ID telephone device is shown, which can identify the caller of a telephone call in either the on-hook or off-hook states. The CID telephone device includes a circuit for detecting a CPE alerting signal, a circuit for generating an acknowledgment signal when the CPE alerting signal is detected, a circuit for demodulating the modulated CID data stream, and a circuit for analyzing the data stream and output parallel data.

14 Claims, 8 Drawing Sheets

Fig. 8
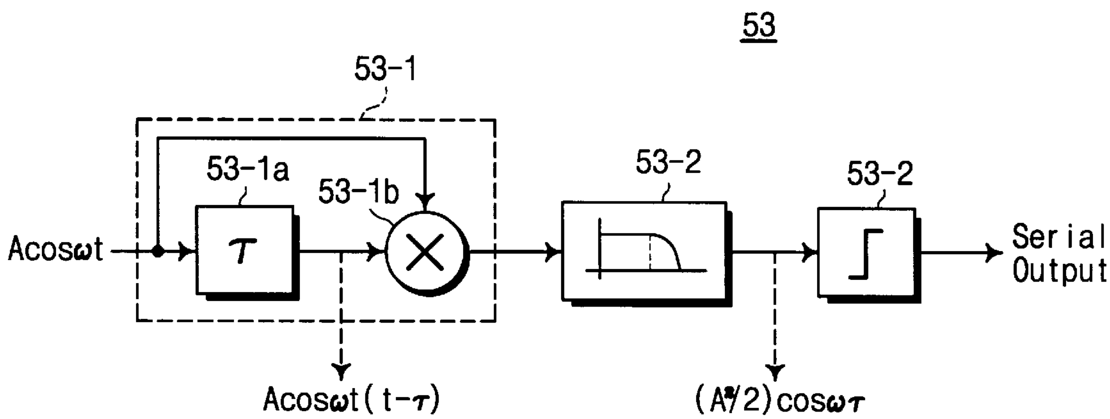
Fig.9A
Fig.9B
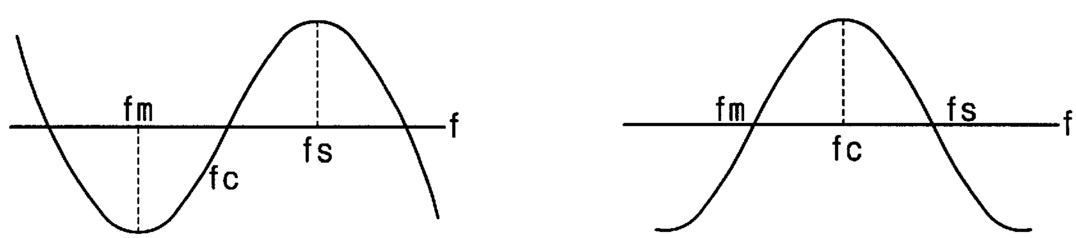
Fig.10
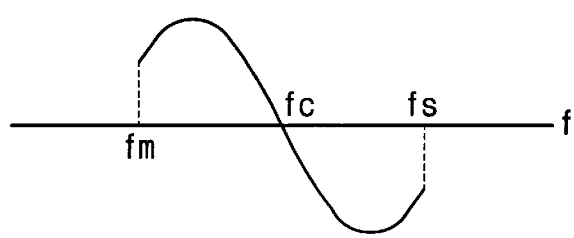

TELEPHONE DEVICE FOR CALLER IDENTIFICATION

FIELD OF THE INVENTION

The present invention relates generally to telephone devices (including facsimiles) and, more particularly, to digital telephone devices having a function of characterizing a telephone call by identifying the caller.

BACKGROUND OF THE INVENTION

Caller identification (CID) service is the generic name for a service provided by the telephone companies (i.e., Stored Program Controlled Switching systems; SPCSs) to deliver information such as the caller's telephone number and/or name to a telephone set (i.e., Customer Premises Equipment; CPE) of the called subscriber at the beginning of a call. A variant of CID, Caller Identification on Call Waiting (CIDCW), delivers this information about an incoming caller while the called subscriber is already engaged in a phone call.

The caller identity information can be used in many ways. A few examples include tracking who has called over a specified period of time, accessing data base information on the calling party, tracing malicious callers, storing number in memory for quick redialing, and blocking unwanted calls.

In most countries, the caller identity data stream is transmitted in 1200 baud Bell 202 standard or CCITT V.23 FSK (Frequency Shift Keying) format. The telephone or adjust box demodulates the FSK signal and displays the caller's number and/or name on an LCD (Liquid Crystal Display). In FIG. 1, there is shown a format of the transmitted data stream for the CID service.

Referring to FIG. 1, the transmitted data stream includes a channel seizure signal 21 which serves to notify a CPE that the caller identity data packet (or CID data message) will be transmitted followed by a mark signal 22 containing a train of "1" bits. This mark signal 22 is used to identify the head of a data message. The data stream further includes CID data packet 20 which is composed of ASCII codes of which is framed by a start bit and a stop bit. The data packet 20 contains the CID information on telephone number, name, month, date, hour, minute and so on. The size of data packet 20 is 144 bits in the U.S.A. and is about 250 bits in Canada. The data stream finally includes a checksum word signal 23 which is transmitted after the data packet 20. The checksum signal 23 is used to ensure that the CPE has received the data packet correctly. That is, error detection is provided by the use of the checksum word 23.

FIG. 2A is a diagram illustrating the caller information reception process of a telephone set 10 (i.e., CPE) in an on-hook state. In this state, the CID data is transmitted to a called subscriber during a 4 second pause interval between first and second ring signals RING#1 and RING#2. The ring signals are used to ring a bell of the telephone set (i.e., CPE) 10 at the called party and are each continuous for about two seconds, as is well known.

FIG. 2B is a diagram illustrating the caller information reception process of a telephone set in an off-hook state. In this state, SPCS 12 applies a CPE alerting signal ALERT of 2130 Hz and 2750 Hz dual tone to the CPE (i.e., telephone set ) 10 of the called subscriber for 80 msec I/–5 msec. This signal is intended to alert the CPE to prepare for the incoming CID data. Within about 100 msec after detecting the CPE alerting signal ALERT, the CPE 10 should reply to the SPCS 12 with an acknowledgment signal ACK. Once the SPCS 12 has detected the acknowledgment signal ACK, it transmits the CID data to the CPE 10 via 1200 baud Bell 202 format FSK signal. But, in this case, the channel seizure signal is not transmitted and only the mark signal is transmitted to the CPE only for 66.7 msec.

FIG. 3 is a block diagram showing an example of an analog telephone set having CID function only in the on-hook state. Referring to FIG. 3, the telephone set includes a CID receiver 30, two switches 40 and 44, AC coupler 42, and telephone circuitry 46. Further, the CID receiver 30 includes a ring detector 32, a demodulator 34 for performing the demodulation of the received FSK signals, an energy estimator 36 for estimating the energy of the received signals, and a comparator 38 for converting the demodulated signals to a serial bit stream.

The ring detector 32 serves to detect whether the first ring signal is applied, and to close the switch 40 when the first ring signal is detected. The AC coupler 42 performs AC-coupling for the CID data signal received via the telephone line. This circuit 42 allows the telephone set to remain in the on-hook state substantially, regardless of the operation state of the CID receiver 30. The AC-coupled signal is provided to the demodulator 34. The ring detector 32 then causes the switch 40 to be open before the second ring signal is received. When the called subscriber lifts the handset of the telephone set after he/she identifies the caller's identity, the switch 44 becomes closed and the telephone circuitry 46 thus goes to the off-hook state.

According to this technique, it is easy for a CID receiver to receive the CID data in the on-hook state because the receiver 30 is equipped with the ring detector 32.

However, in order to receive the data in the off-hook state, the receiver 30 needs a tone detector for detecting the CPE alerting signal transmitted from the SPCS and a tone generator for generating the acknowledgment signal in response to the CPE alerting signal. In addition, there is a drawback that it is fairly difficult to design the demodulator and comparator suitable for noise characteristics and relatively high transmission speed in analog techniques. Additional external logic circuitry is further required for processing the channel seizure signal, mark signal, start bit and stop bit since the final output of the CID receiver is the serial bit stream.

SUMMARY OF THE INVENTION

It is, therefore, an object of the present invention to provide a telephone device which solves the above-mentioned problems.

It is another object of the present invention to provide a telephone device which has a caller identification receiver capable of operating regardless of the telephone's hooked state, i.e. on-hook or off-hook state.

It is still another object of the invention to provide a telephone device which has a digital identification receiver capable of processing the received data signal in discrete signal domain.

In order to attain the above objects, according to an aspect of the present invention, there is provided a telephone device that can receive an information signal which is modulated in a predetermined way (e.g. frequency shift keying modulation) and includes caller identification information about a calling party. The telephone device comprises a CPE (Customer Premises Equipment) alert detecting circuit, an acknowledge generating circuit, a gain adjusting circuit, a demodulation circuit, a comparison circuit, an energy monitoring circuit, a signal analyzing circuit, and a serial-toparallel converting circuit. The CPE alert detecting circuit detects an externally applied alert signal indicating that the information signal will be given.

The acknowledge generating circuit generates an acknowledgment signal indicating an intention to receive the information signal when the alert signal is detected. The demodulation circuit serves to demodulate the information signal. The comparison circuit serves to convert the demodulated information signal to a serial data stream including mark data and message data. The mark data identifies the head of the message data and the message data has the caller identification information. The energy monitoring circuit detects whether the information signal appears or not. The signal analyzing circuit extracts the message data from the serial data stream but performs its extraction operation only when the information signal appears. The serial-to-parallel converting circuit serves to convert the extracted message data into parallel data.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 8 is a block diagram showing a detailed circuit construction of the demodulator & comparator circuit of FIG. 4;

FIGS. 9A and 9B are schematic diagrams illustrating two possible output characteristics of a phase detector for caller identification;

FIG. 10 is a schematic diagram illustrating output characteristic of the phase detector of FIG. 8.

DESCRIPTION OF THE PREFERRED EMBODIMENT

It should be understood that the description of this preferred embodiments is merely illustrative and that it should not be taken in a limiting sense. In the following detailed description, several specific details are set forth in order to provide a thorough understanding of the present invention. It will be obvious, however, to one skilled in the art that this invention may be practiced without these specific details.

Figure 1:
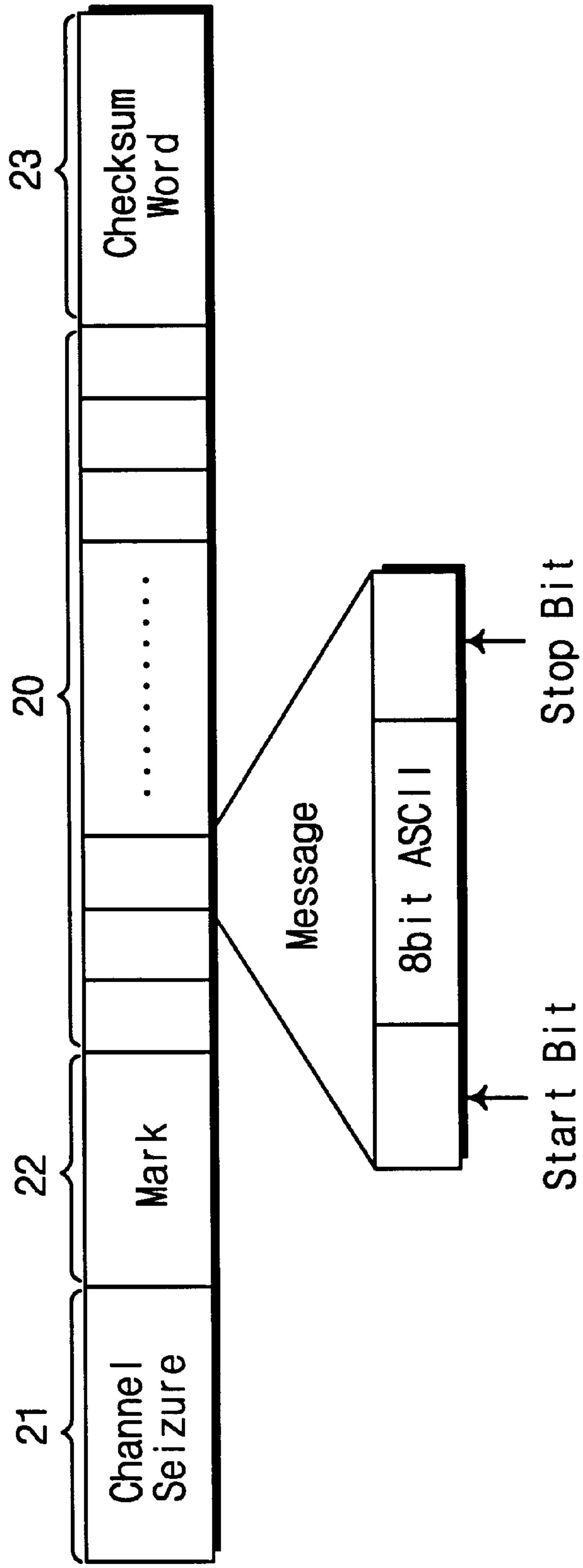
FIG. 1 is a schematic diagram illustrating a format of a caller identification data stream.
Figure 2A:
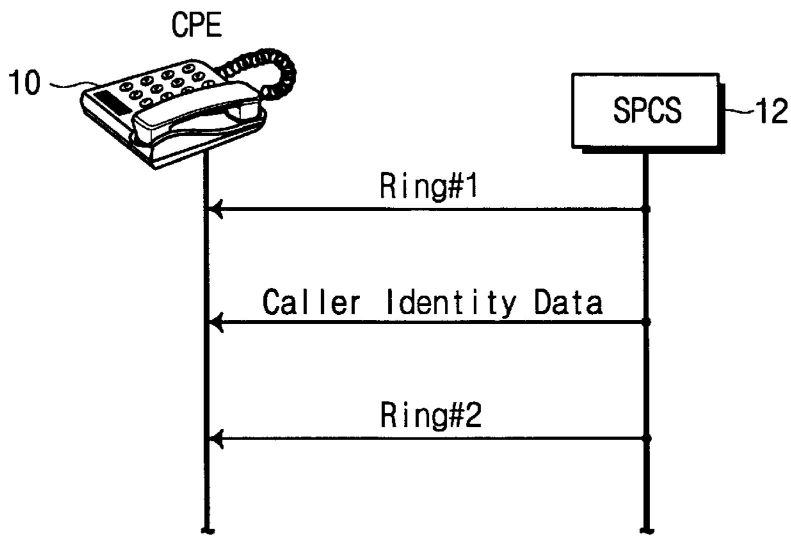
FIG. 2A is a schematic diagram illustrating the caller information reception process of a telephone set in an on-hook state.
Figure 2B:
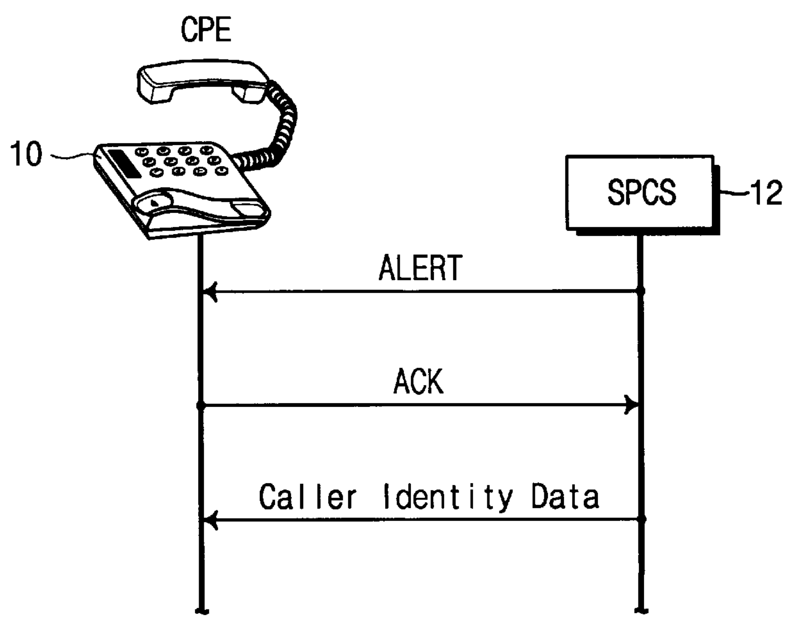
FIG. 2B is a schematic diagram illustrating the caller information reception process of a telephone set in an off-hook state.
Figure 3:
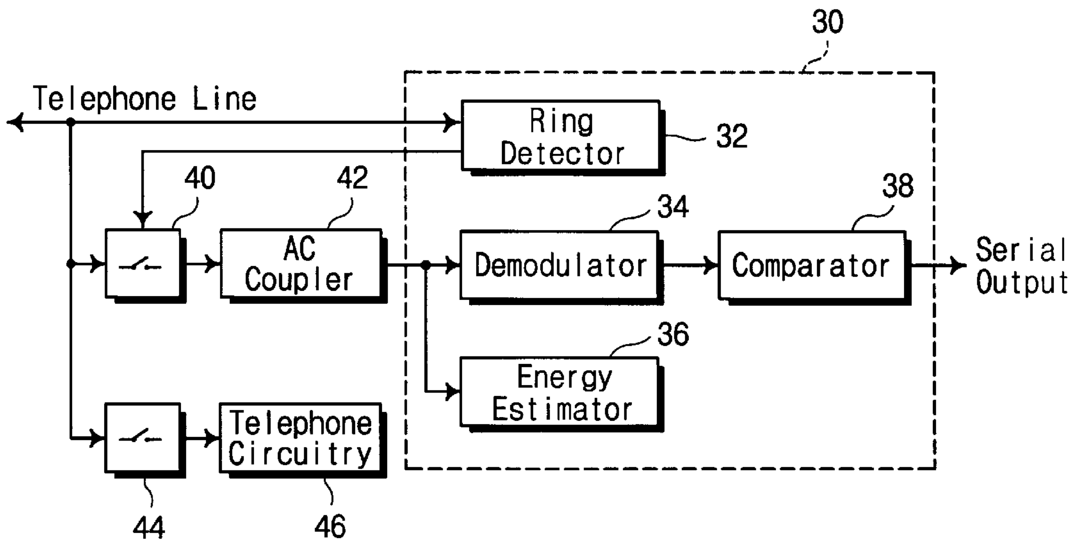
FIG. 3 is a block diagram showing an example of a conventional analog telephone set having a CID function.
Figure 4:
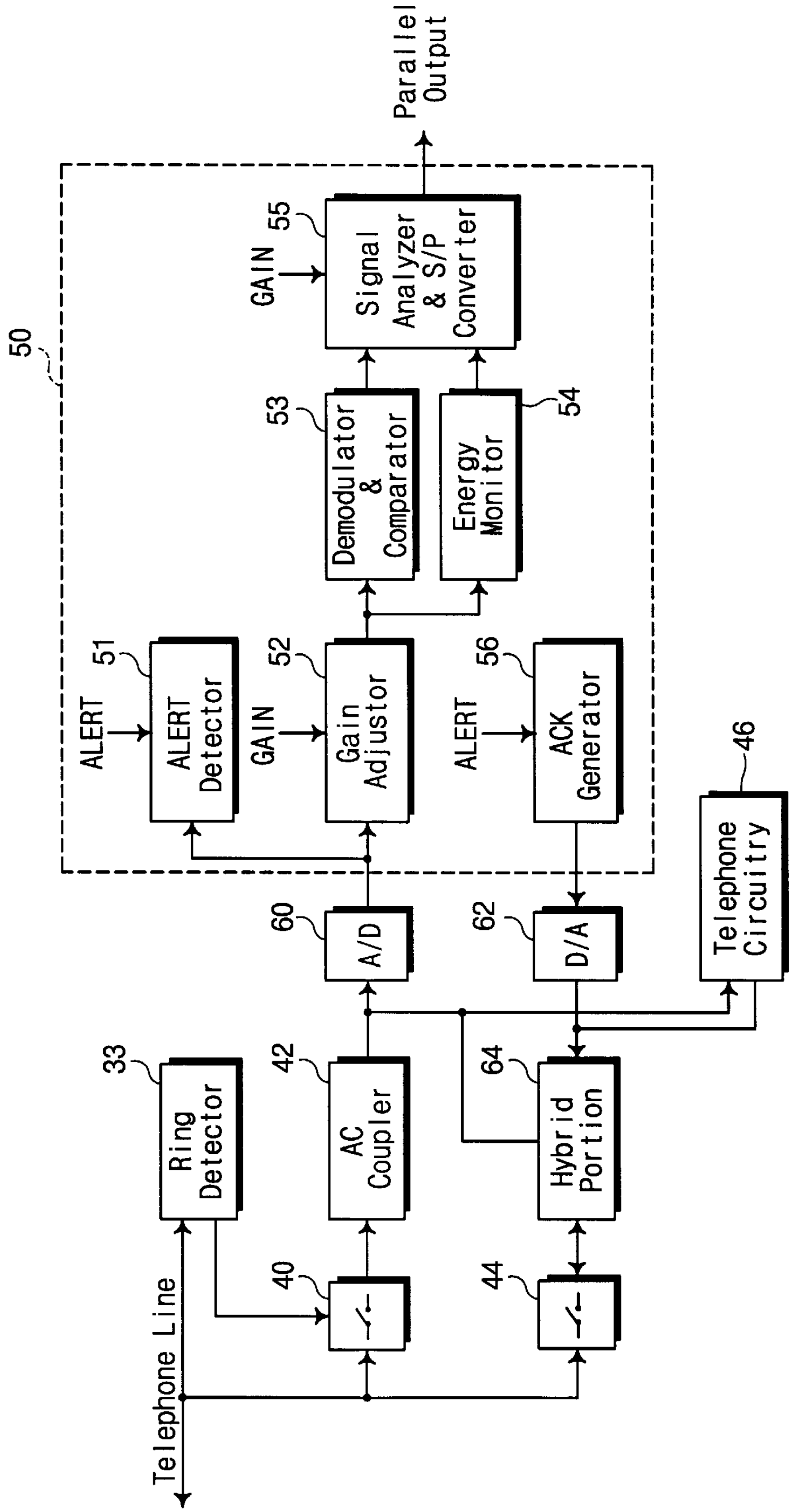
FIG. 4 is a block diagram showing an embodiment of a telephone CPE device with caller identification function according to the present invention.

FIG. 4 shows an embodiment of a telephone device supporting caller identification (CID) service in accordance with this invention. Referring to FIG. 4, a telephone device (e.g. a telephone set, a facsimile, etc.) which has a function of characterizing a telephone call by identifying the caller includes a single digital CID receiver chip 50. The digital CID receiver 50 has a CPE (Customer Premises Equipment) alert detecting circuit 51, a gain adjusting circuit 52, a demodulation & comparison circuit 53, an energy monitoring circuit 54, a signal analyzing & serial-to-parallel (S/P) converting circuit 55, and an acknowledge generating circuit 56.

The telephone device further includes a ring detector 33 connected to a telephone line, a first signal path composed of a switch 40 connected to the telephone line, an AC coupler 42 connected to the switch 40 and an analog-to-digital (A/D) converter 60 commonly connected to the CPE alert detecting circuit 51 and the gain adjusting circuit 52 within the CID receiver 50, and a second signal path composed of a switch 44 connected to the telephone line, a digital-to-analog (D/A) converter 62 connected to the acknowledge generating circuit 56 within the CID receiver 50, and a common telephone hybrid 64 connected between the switch 44 and the D/A converter 62. As shown in the figure, the telephone device still further includes common telephone circuitry 46. The telephone circuitry 46 is commonly connected to the AC coupler 42 and the telephone hybrid 64.

Hereinafter, the operation of the telephone device with caller identification will be described in detail with reference to FIGS. 4 to 11.

The caller identity data stream is transmitted in 1200 baud Bell 202 or CCITT V.23 FSK (Frequency Shift Keying) format. The telephone (or adjust box) demodulates the FSK signal and displays the caller's number and/or name on an LCD (Liquid Crystal Display). As described in the earlier background section of this application, the transmitted data stream includes a channel seizure signal which serves to notify a CPE that the caller identity data packet (or CID data message) will be followed by a mark signal containing a train of "1" bits each of which continues for about 25 msec over 150 msec and alternates with spaces containing a train of "0" bits. This mark signal is used to identify the head of a data message and to allow the time for the CPE to adapt itself to the characteristics of the transmission line.

The data stream further includes a CID data packet which is composed of a plurality of 8-bit ASCII codes. Each ASCII code is framed by a start bit and a stop bit. The data packet contains the CID information on telephone number, name, month, date, hour, minute, etc. The data stream further includes a checksum word signal which is transmitted after the data packet. This signal is used to ensure that the CPE has received the data packet correctly. That is, error detection is provided by the use of the checksum word.

The checksum word is the two's complement of the modulo 256 sum of all the preceding words in the data packet (i.e. all message type and length, all parameter type and length, and all parameter words). The modulo 256 sum is computed by adding the words together and then truncating the sum to the least significant 8 bits. The CPE should calculate the modulo 256 sum of all words in the received message and add it to the received checksum in order to verify reception of the CID information without errors. Key characteristics and parameters of the transmitted data stream are summarized in table 1.

TABLE 1

| | |
|---|---|
| Transmission | 2-wire, simplex |
| Modulation | Phase coherent FSK |
| Carrier | 1700 Hz |
| Mark | 1200 +/− 12 Hz |
| Space | 2200 +/− 22 Hz |
| Transmission Speed | 1200 baud |
| Transmission Level | −13.5 +/− 1 dBm into 900 Ohm load |

The CID data can be transmitted to the called subscriber in the off-hook state of his/her telephone set (i.e. CPE) as well as the on-hook state.

Referring back to FIG. 4, when the telephone set is in the on-hook state, the ring detector 33 detects whether or not a first ring signal is inputted via the telephone line and forces the switch 40 to be closed when the first ring signal is detected. The AC coupler 42 performs AC-coupling for the received CID data signal which is received via the telephone line, thereby allowing the telephone set to be in the on-hook state regardless of the operation status of the CID receiver 50. The AC-coupled CID data signal is thus supplied to the A/D converter 60. Then, the ring detector 32 makes the switch 40 open before the second ring signal is received. When the called subscriber lifts the handset of the telephone set after he/she identifies the caller's identity, the switch 44 closed. The telephone circuitry 46 thus goes to normal operation state for conversation (i.e. off-hook state).

On the other hand, when the telephone set is in the off-hook state, the switch 44 is closed and the CID data signal inputted via the telephone line is provided to the CID receiver 50 through the signal path composed of switch 44, telephone hybrid 64 and A/D converter 60. Via this path, the CPE alert detecting circuit 51 within CID detector 50 detects a CPE alerting signal ALERT provided from SPCS. When the CPE alerting signal ALERT is detected, then the CPE alert detecting circuit 51 informs the acknowledge generating circuit 56. The acknowledge generating circuit 56 then generates an acknowledgment signal ACK. The ACK signal is transmitted to the SPCS via D/A converter 62, telephone hybrid 64, switch 44, and telephone line, and thus the called subscriber can receive CID information from SPCS.

As described above, this CID receiver 50 can be operational regardless of the telephone's hooked state, i.e. on-hook or off-hook state, thereby allowing the called subscriber to receive information about a caller at any time.

In this embodiment, a PCM codec (Pulse Code Modulation coder/decoder) having a sampling frequency of about 8 KHZ can be used as the A/D and D/A converters 60 and 62. In this case, it is necessary to incorporate logic circuitry for converting PCM signal to linear signal, and vice versa, into the CID receiver chip 50.

Figure 5:
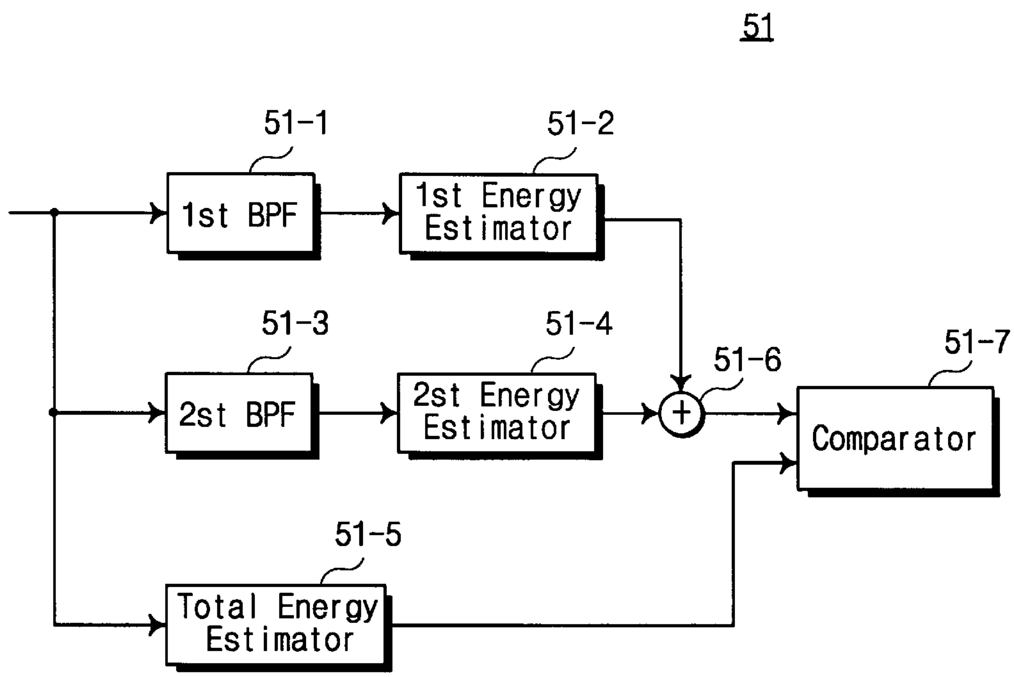
FIG. 5 is a block diagram showing a detailed circuit construction of the CPE alert detection circuit of FIG. 4.

FIG. 5 shows the construction of the CPE alert detecting circuit of FIG. 4. Referring to FIG. 5, the detecting circuit 51 includes first and second band pass filters 51-1 and 51-3, first and second partial energy estimators 51-2 and 51-4, a total energy estimator 51-5, an adder 51-6, and a comparator 51-7.

Referring to FIGS. 4 and 5, in the off-hook state, the digital output signal of the A/D converter 60 is provided to the band pass filters 51-1 and 51-3, which have center frequencies of 2130 Hz and 2750 Hz respectively. Each of the filters 51 -1 and 51-3 has a narrow band width sufficient to cut off other band signals except for the CPE alerting signal. The band pass filter 51-1 passes frequency components within a first predetermined bandwidth of the CPE alerting signal. The band pass filter 51-3 passes frequency components within a second predetermined bandwidth different from the first bandwidth of the CPE alerting signal. The partial energy estimator 51-2 estimates an energy level of an output of the band pass filter 51-1. The partial energy estimator 51-4 estimates an energy level of an output of the band pass filter 51-3. The total energy estimator 51-5 estimates an energy level of the CPE alerting signal. The adder 51-6 adds outputs of the partial energy estimators 51-2 and 51-4. The comparator 51-7 compares an output of the adder 51-6 with an output of the total energy estimator 51-5 so as to determine whether the CPE alerting signal is applied or not.

The band pass filters 51-1 and 51-3 can be implemented as digital band pass filters. Generally, the form of each digital band pass filter is determined by considering its complexity, memory size required for its construction, its performance, etc. In this embodiment, the filters 51-1 and 51-3 are composed of elliptic infinite impulse response filters.

The output signals of the filters 51-1 and 51-3 are provided to the partial energy estimators 51-2 and 51-4, respectively. On the other hand, the total energy estimator 51-5 is directly fed with the output signal of the A/D converter 60 without filtering and calculates the total energy of all received signals. To interpret the amplitudes of the signals from an energy standpoint, the received signals are provided to the energy estimators 51-2, 51-4 and 51-5. In this embodiment, energy estimators of a leak integrator type are used.

Figure 6:
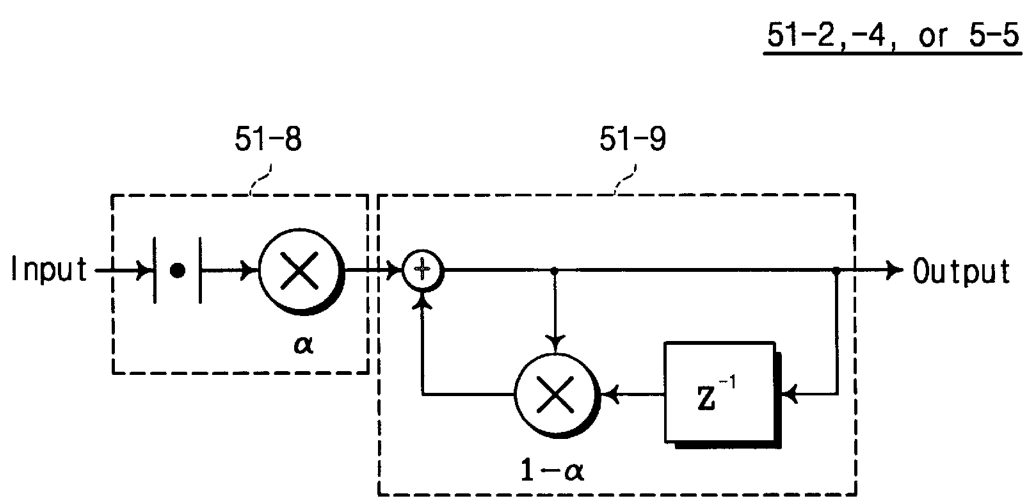
FIG. 6 is a block diagram showing a detailed circuit construction of each of the energy estimators of FIG. 5.

FIG. 6 shows the construction of each of the energy estimators of FIG. 5 in detail. In FIG. 6, reference numeral 51-8 identifies an absolute value calculation part for calculating the absolute value of an input signal and reference numeral 51-9 identifies an integrator. Reference character a indicates a time constant by which the response speed of the estimator is determined. Reference character z represents a Z-transform and $Z^{-}$ represents a time delay.

Turning back to FIG. 5, the sum of the outputs of the partial energy estimators 51-2 and 51-4 is produced by the adder 51-6 and input to the comparator 51-7 together with the output of the total estimator 51-5. The comparator 51-7 compares the two input signals. It is determined depending upon the comparison result whether there exists a CPE alerting signal or not. In this determination process, besides the comparison result, the energy difference (i.e. positive and negative twists) of the two received signals whose frequencies are different from each other, on-time and drop-out time durations of respective signals, malfunction in the receiver due to audio signal and so on are taken into consideration.

Figure 7:
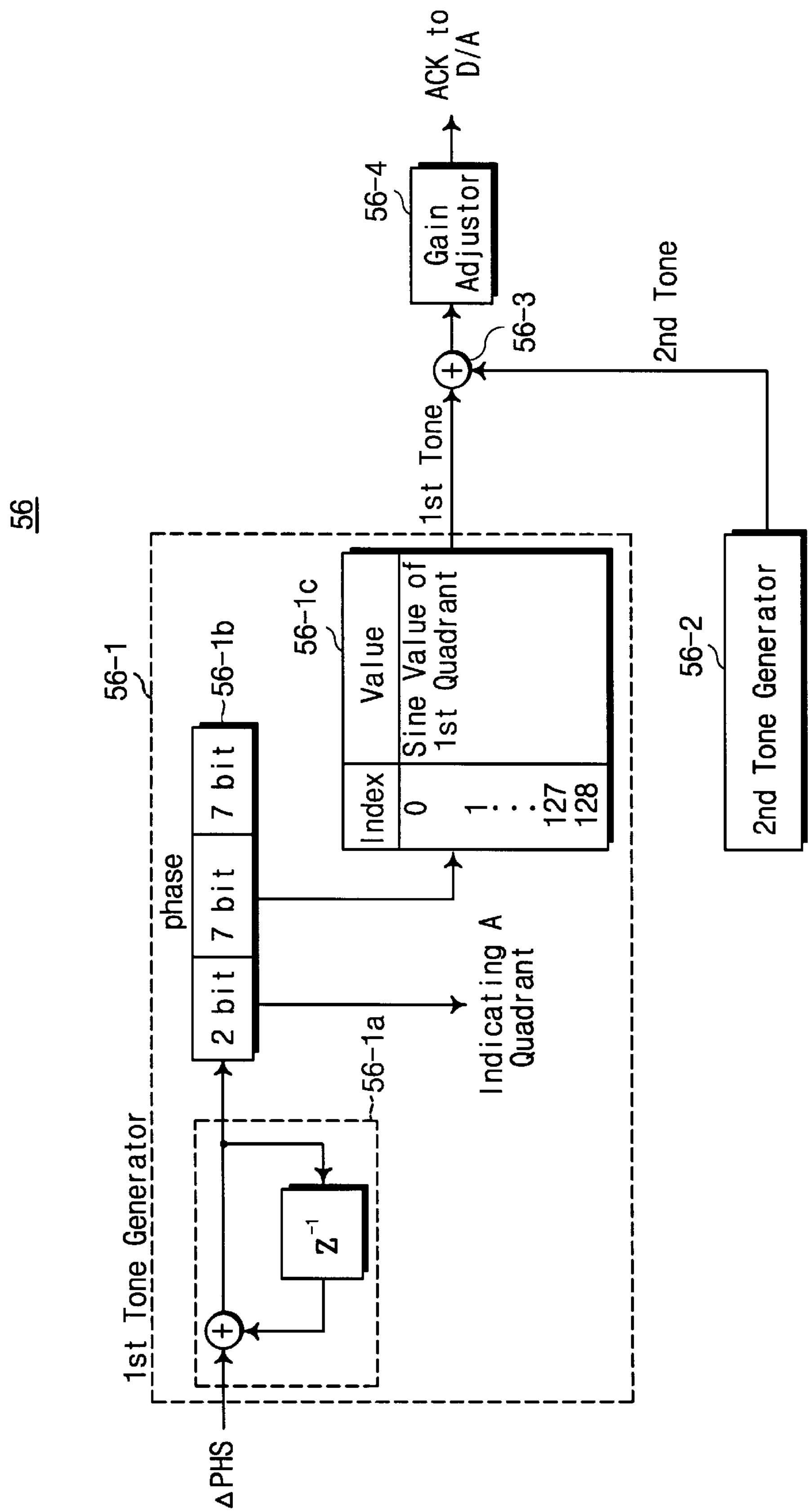
FIG. 7 is a block diagram showing a detailed circuit construction of the ACK generator circuit of FIG. 4.

FIG. 7 shows the acknowledge generating circuit 56 of FIG. 4. Referring to FIG. 7, the acknowledge generating circuit 56 includes first and second tone generators 56-1 and 56-2, an adder 56-3 and a gain adjustor 56-4. Each of the tone generators 56-1 and 56-2 is composed of an integrator 56-1*a*, a phase data storage register 56-1*b*, and a look-up table 56-1*c*.

The acknowledge generating circuit 56 generates a dual sine wave acknowledgment signal ACK which corresponds to a dual tone multi-frequency (DTMF) signal using two frequencies of 941 Hz and 1633 Hz. The integrator 56-1*a* is supplied with a data signal ΔPHS having a frequency $f_p$ corresponding to one of the two frequency components (e.g.

941 Hz) and generates a phase data signal in accordance with time variation. The signal ΔPHS is generated at the node between the AC coupler 42 and the A/D 60 in FIG. 4 and at the node between the AC coupler 42 and the A/D 60*a* in FIG. 11. For a 16-bit system, the relation between the frequency $f_p$ of the ΔPHS and the frequency $f_d$ of the intended signal is given by the following:

$$f_p = \frac{2^{15}}{f_{ss}} \cdot f_d \quad (1)$$

where $f_{ss}$ is a sampling frequency.

The most significant bit and the next upper order bit of the 16-bits of output data of the integrator 56-1*a* are used to indicate a quadrant of a sine curve. The next 7 upper-order bits, after the first two bits, are used as an index into the look-up table 56-1*c*. The remaining bits are ignored, but they are attributed to producing sine wave correctly. In this embodiment, the size of the look-up table 56-1*c* is 129, and thus one quadrant of a sine curve is available in the size. By using the nine upper order bits and the characteristics of trigonometric functions, we can calculate the sine value for all of four quadrants depending upon the signal ΔPHS. In this manner, the tone generator 56-1 generates a first tone signal.

The second tone generator 56-2 has the same construction as that of the first tone generator 56-1, except that its integrator is supplied with a data signal having a frequency corresponding to the other one of the two frequency components (e.g. 1633 Hz). The second tone generator 56-2 generates a second tone signal like the first tone generator. The adder 56-3 synthesizes the first and second tone signals and generates the acknowledgment signal ACK having two frequency components. This acknowledgment signal ACK is provided via the gain adjustor 56-4 to the D/A converter 62.

As described above, when the CPE alerting signal ALERT is detected, the CPE alert detecting circuit 51 informs the acknowledge generating circuit 56 that it has detected the ALERT. The acknowledge generating circuit 56 then generates the acknowledgment signal ACK. This signal ACK is transmitted to the SPCS via D/A converter 62, telephone hybrid 64, switch 44, and telephone line, and thus the called subscriber can receive CID information from SPCS.

Turning again to FIG. 4, the gain adjusting circuit 52 serves to adjust the gain of the received signal for convenience of the signal processing in the following stages. The energy monitoring circuit 54 monitors the output energy level of the gain adjusting circuit 52 and discriminates between the appearance and disappearance of the CID data signal. The output of this circuit 54 is used for signal analysis which will be described later.

FIG. 8 shows a detailed circuit construction of the demodulation & comparison circuit 53 within the CID receiver 50 shown in FIG. 4. Referring to FIG. 8, the demodulation & comparison circuit 53 includes a phase detector 53-1, a low pass filter 53-2, and a comparator 53-3.

The phase detector 53-1 receiving the FSK signal has a delay circuit 53-1*a* and a multiplier 53-1*b* as shown. In the phase detector 53-1, a signal Acosωt of a sinusoidal wave form is multiplied by a signal Acosω(t−τ) which is delayed over τ, where A, ω and τ are amplitude, angular frequency and delay time, respectively. The output signal of the phase detector 53-1 can be represented as following equation (2), by using the addition theorems for trigonometric functions.

$$\begin{aligned} A\cos\omega t \cdot A\cos(t-\tau) &= A^2[\cos^2\omega t\cos\omega\tau + \cos\omega t\sin\omega t\sin\omega\tau] \quad (2)\\ &= A^2\left[\frac{(1+\cos 2\omega t)\cos\omega\tau}{2} + \frac{\sin 2\omega t\sin\omega\tau}{2}\right]\\ &= \frac{A^2}{2}[\cos\omega\tau + \cos\omega(2t-\tau)] \end{aligned}$$

High frequency components in the second term of the above equation (2) are removed by the low pass filter 53-2, and thus the final output of the filter 53-2 becomes $A^2/2\cos\omega\tau$. Since τ can be represented as an integral multiple of the sampling period $1/f_{ss}$ and ω is equal to 2πf, the final output of the filter 53-2 can be given by the equation (3)

$$\frac{A^2}{2}\cos\omega\tau = \frac{A^2}{2}\cos\left(\frac{2\pi fn}{f_{ss}}\right) \quad (3)$$

where n is an integer which identifies the number of the samples multiplied in the phase detector 53-1, and $f_{ss}$ is a sampling frequency. In the case the sampling frequency $f_{ss}$ is 8 KHz, by substituting 2π with 360 degrees, the output signal of the low pass filter 53-2 can be written as the equation (3-1).

$$\frac{A^2}{2}\cos\left(\frac{2\pi fn}{f_{ss}}\right) = \frac{A^2}{2}\cos\left(\frac{360nf}{8000}\right) = \frac{A^2}{2}\cos\left(\frac{9nf}{200}\right) \quad (3-1)$$

On the other hand, when the integer n is selected so as to obtain the waveform of FIG. 9A, then the threshold value can be set to zero, and thus the noise margin can be increased as much as possible. In FIG. 9A, $f_c$, $f_m$ and $f_s$ denote the frequencies of the carrier, mark and space signals, respectively.

However, when the integer n is selected to obtain the waveform of FIG. 9B, then it is difficult to acquire the desired output signal of the phase detector 53-1. In order to avoid such a case, the integer n ought to satisfy the following conditions.

First, the parameter $9nf_c/200$ should be equal or very close to 90(2k+1), in which k denotes zero or an integer greater than one. Secondly, it is desirable that a phase difference θ $(=9n(f_c-f_m)/200=9n(f_s-f_c)/200)$ approaches 90 degrees to the extent possible, where the maximum value $\theta_{max}$ of the phase difference is 180 degrees.

As described before, because the frequencies $f_c$, $f_m$ and $f_s$ are 1700, 1200 and 2200 KHZ respectively, the equations (4-1) and (4-2) are obtained.

$$\frac{9 \cdot 1700n}{200} = 90(2k+1) \quad (4-1)$$

$$\theta_{max} = \frac{9 \cdot 500n}{200} \le 180 \quad (4-2)$$

The equations (4-1) and (4-2) can be simplified in the equations (5-1) and (5-2), respectively.

$$n = \frac{20(2k+1)}{17} \quad (5-1)$$

$$n \le 7 \quad (5-2)$$

From the above equations (5-1) and (5-2), if k=0, then n=1.18; if k=1, then n=3.52; if k=2, then n=5.88. In the case where k=2 and n=6 are selected, then the carrier, mark and space signals outputted from the phase detector 53-1 can be represented respectively as followings $$\frac{A^2}{2}\cos\omega_c\tau = \frac{A^2}{2}\cos\left(\frac{54\times 1700}{200}\right) = \frac{A^2}{2}\cos 459^\circ \quad (6-1)$$

$$\frac{A^2}{2}\cos\omega_m\tau = \frac{A^2}{2}\cos\left(\frac{54\times 1200}{200}\right) = \frac{A^2}{2}\cos 324^\circ \quad (6-2)$$

$$\frac{A^2}{2}\cos\omega_s\tau = \frac{A^2}{2}\cos\left(\frac{54\times 2200}{200}\right) = \frac{A^2}{2}\cos 594^\circ \quad (6-3)$$

and the output characteristic of the phase detector 53-1 is schematically illustrated in FIG. 10.

Referring back to FIG. 8, the low pass filter 53-2 eliminates high-frequency components, and its bandwidth should be greater than at least half of the transmission speed (1200 baud). The comparator 53-3 has a predetermined threshold value (e.g. zero) and a conversion speed equal to the sampling speed, and converts the output level of the filter 53-2 to a digital logic value. The comparator 53-3 outputs a serial bit stream to the signal analysis & S/P conversion circuit 55 shown in FIG. 4.

The signal analysis & S/P conversion circuit 55 controls the gain adjusting circuit 52 so as to adjust the signal level of the data signal applied to the demodulation & comparison circuit 53 when the energy monitoring circuit 54 detects the appearance of the CID data signal from SPCS. Thereafter, the circuit 55 waits for the mark signal which follows the channel seizure signal. When the mark signal has been detected, the circuit 55 waits until the start bit followed by 8-bit ASCII message code is found. In case of thc off-hook state, there is no need to wait until the channel seizure signal passes. Once the start bit is found, the start bit and the stop bit in front and in the rear of each ASCII message byte are removed, and then the ASCII codes including the checksum word are outputted to the outside of the CID receiver 50 via the S/P conversion circuit 55. Moreover, information about whether the signal under reception is a message signal or an auxiliary signal can be transmitted to a user. Such signal processing continues until the energy monitor 54 detects disappearance of the signal.

Figure 11:
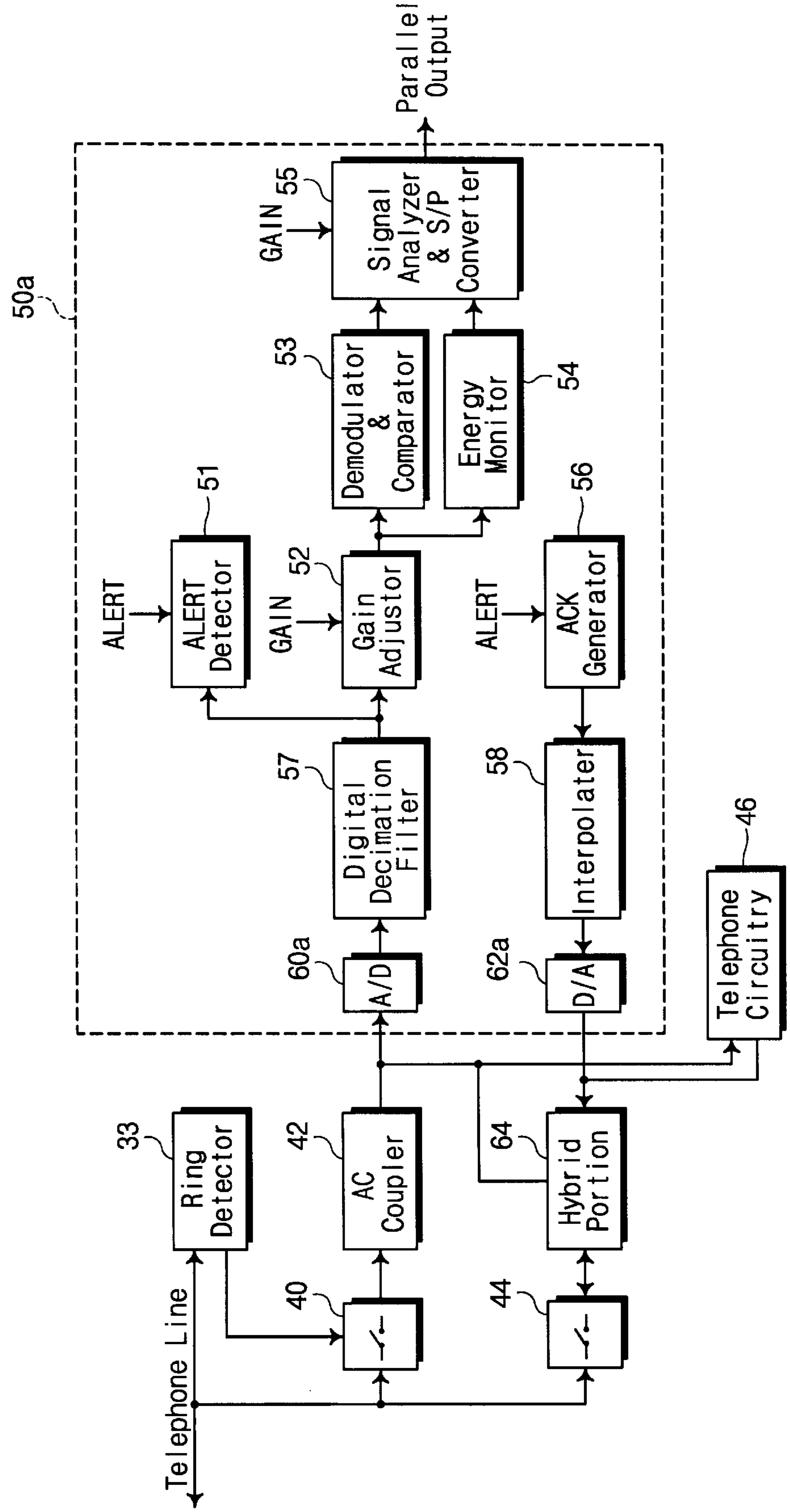
FIG. 11 is a block diagram showing another embodiment of the telephone device with caller identification function according to this invention.

FIG. 11 is a block diagram showing another embodiment of the telephone device with caller identification function according to the present invention. In FIG. 11, the same units as those shown in FIG. 4 are denoted by the same reference numerals and are not described in detail below. In this embodiment, an A/D converter 60*a* has an over-sampling scheme, and thus a digital decimation filter circuit 57 is required for performing a rate reduction of the over-sampled output of the A/D converter 60*a* in the digital domain and an interpolation circuit 58 for conducting the rate elevation of the input signal of a D/A converter 62*a* in the same domain. According to this embodiment, the A/C and D/A converters can be incorporated in CID receiver chip 50*a*.

Although the invention has been described and illustrated in the above description and drawings, it is understood that this description is by example only. Numerous changes and modifications can be made by those skilled in the art without departing from the true spirit and scope of the invention.

What is claimed is:

1. A telephone device capable of receiving an information signal which is modulated in a predetermined way and includes caller identification information about a calling party, the device comprising:

means for detecting an externally applied alert signal indicating that the information signal will be given;

means for generating an acknowlegment signal indicating an intention to receive the information signal;

means for demodulating the information signal;

means for converting the demodulated information signal to a serial data stream including mark data and message data, wherein the mark data identifies the head of the message data and the message data has the caller identification information;

means for extracting the message data from the serial data stream;

means for converting the extracted message data into parallel data;

a ring detector;

a switchhook; and dual switched paths for coupling an attached telephone line to the means for demodulating the information signal, the first switched path being actuated upon ring detection by the ring detector, and the second switched path being actuated by closing of the telephone device's switchhook.

2. The device according to claim 1 further comprising means for detecting whether the information signal appears or not.

3. The device according to claim 2, wherein said means for extracting the message data performs its extraction operation only when the information signal appears.

4. The device according to claim 1, wherein said means for detecting the alert signal comprises a first band pass filter for passing first frequency components of the alert signal, a second band pass filter passing second frequency components of the alert signal, a first energy estimator for estimating an energy level of an output of the first band pass filter, a second energy estimator for estimating an energy level of an output of the second band pass filter, a third energy estimator for estimating an energy level of the alert signal, an adder for adding outputs of said first and second energy estimators, and a comparator for comparing an output of said adder with an output of said third energy estimator to determine whether the alert signal is applied or not.

5. The device according to claim 1, wherein said information signal is modulated in frequency shift keying modulation.

6. The device according to claim 5, wherein said means for demodulating the information signal comprises a phase detector and a low pass filter.

7. The device according to claim 6, wherein said means for converting the demodulated information signal to the serial data stream comprises a comparator.

8. The device according to claim 1, wherein said means for generating an acknowledgment signal comprises a first tone generator for generating a first tone signal of a first frequency, a second tone generator for generating a second tone signal of a second frequency different from the first frequency, and an adder for synthesizes the first and second tone signals.

9. The device according to claim 8, wherein said first and second tone generators each comprises a look-up table for generating a phase data signal depending on time variation.

10. A telephone device capable of receiving an analog information signal which is modulated in a predetermined way and includes caller identification information about a calling party, the device comprising:

means for converting the analog information signal and an alert signal indicating that the information signal will be given into digital signals;

means for detecting the digital alert signal;

means for generating a digital acknowledgment signal indicating an intention to receive the information signal;

means for converting the digital acknowledgment signal into an analog signal;

means for demodulating the digital information signal;

means for converting the demodulated digital information signal to a serial data stream including mark data and message data, wherein the mark data identifies the head of the message data and the message data has the caller identification information;

means for detecting whether the information signal appears or not;

means for extracting the message data from the serial data stream only when the information signal appears;

means for converting the extracted message data into parallel data;

a ring detector;

a switchhook; and dual switched paths for coupling an attached telephone line to the means for converting the analog information signal into a digital signal, the first switched path being actuated upon ring detection by the ring detector, and the second switched path being actuated by closing of the telephone device's switchhook.

11. The device according to claim 10, wherein said means for converting the analog signals into digital signals and said means for converting the digital signal into the analog signal are composed of a pulse code modulation codec.

12. A telephone device capable of receiving an analog information signal which is modulated in a predetermined way and includes caller identification information about a calling party, the device comprising:

means for converting the analog information signal and an alert signal indicating that the information signal will be given into digital signals, in accordance with oversampling scheme;

means for performing rate reduction of the digital signals;

means for detecting the digital alert signal;

means for generating a digital acknowledgment signal indicating an intention to receive the information signal;

means for performing rate elevation of the digital acknowledgment signal;

means for converting the rate-elevated digital acknowledgment signal into an analog signal;

means for demodulating the digital information signal;

means for converting the demodulated digital information signal to a serial data stream including mark data and message data, wherein the mark data identifies the head of the message data and the message data has the caller identification information;

means for detecting whether the information signal appears or not;

means for extracting the message data from the serial data stream only when the information signal appears; and means for converting the extracted message data into parallel data.

13. The telephone device of claim 1, wherein the first switched path comprises an AC coupler and the second switched path comprises a telephone hybrid.

14. The telephone device of claim 10, wherein the first switched path comprises an AC coupler and the second switched path comprises a telephone hybrid.

* * * * *

UNITED STATES PATENT AND TRADEMARK OFFICE

CERTIFICATE OF CORRECTION

PATENT NO. : 5,970,128
DATED : October 19, 2000
INVENTOR(S) : Kim

It is certified that error appears in the above-identified patent and that said Letters Patent is hereby corrected as shown below:

Column 6,
Line 38, "a" should read -- α --.
Line 41, "Z⁻" should read -- $Z^{-1}$ --.

Signed and Sealed this

Seventh Day of May, 2002

Attest:

JAMES E. ROGAN

*Attesting Officer*

*Director of the United States Patent and Trademark Office*